(12) United States Patent
Ho et al.

(10) Patent No.: US 6,282,428 B1
(45) Date of Patent: Aug. 28, 2001

(54) TWO-WAY PAGING SYSTEM HAVING RANDOM REVERSE CHANNEL SLOT SCHEDULING

(75) Inventors: Derek Ho, Vancouver; Barry Buternowsky, Burnaby, both of (CA)

(73) Assignee: Glenayre Electronics, Inc., Charlotte, NC (US)

( * ) Notice: Subject to any disclaimer, the term of this patent is extended or adjusted under 35 U.S.C. 154(b) by 0 days.

(21) Appl. No.: 09/191,368

(22) Filed: Nov. 12, 1998

(51) Int. Cl.$^7$ ........................................................ H04J 3/16
(52) U.S. Cl. ...................... 455/458; 455/466; 340/825.44
(58) Field of Search ................................. 455/31.1, 31.2, 455/31.3, 458; 370/336; 340/825.44

(56) References Cited

U.S. PATENT DOCUMENTS

| | | |
|---|---|---|
| 4,506,361 | 3/1985 | Kume . |
| 4,882,579 | 11/1989 | Siwiak . |
| 5,434,847 | 7/1995 | Kou . |
| 5,485,463 | 1/1996 | Godoroja . |
| 5,638,369 * | 6/1997 | Ayerst et al. .......................... 370/346 |
| 5,663,715 | 9/1997 | Godoria . |
| 5,689,503 | 11/1997 | Wada et al. . |
| 5,691,709 | 11/1997 | Guntin . |
| 5,748,100 * | 5/1998 | Gutman et al. .................. 340/825.44 |
| 5,751,702 | 5/1998 | Evans et al. . |
| 5,799,012 * | 8/1998 | Ayerst et al. .......................... 370/336 |
| 5,805,576 * | 9/1998 | Worley, III et al. .................. 370/337 |
| 5,883,886 * | 3/1999 | Eaton et al. .......................... 370/314 |

* cited by examiner

Primary Examiner—Daniel Hunter
Assistant Examiner—Thuan T. Nguyen
(74) Attorney, Agent, or Firm—Christensen O'Connor Johnson Kindness PLLC

(57) ABSTRACT

In a two-way paging system including a paging terminal, a plurality of paging transmitters, a plurality of paging receivers, and a plurality of two-way paging units, the plurality of two-way paging units transmitting reverse channel messages to the paging receivers in a time division multiplexed protocol, the protocol including a frame with a plurality of reverse channel time slots, a method of assigning reverse channel time slots to the paging units is disclosed. The method comprises: (a) determining a set of transmitting paging units from the plurality of two-way paging units, the set of transmitting paging units being those of the plurality of two-way paging units that are to transmit a reverse channel message; and (b) randomly assigning each of the transmitting paging units in the set of transmitting paging units one of the reverse channel time slots in the frame.

10 Claims, 3 Drawing Sheets

TWO-WAY PAGING SYSTEM HAVING RANDOM REVERSE CHANNEL SLOT SCHEDULING

FIELD OF THE INVENTION

The present invention relates to two-way paging systems, and more particularly, to a two-way paging system that randomly schedules reverse channel transmissions to minimize co-channel, time slot, and adjacent channel interference.

BACKGROUND OF THE INVENTION

A paging system might support millions of pagers using a network of thousands of paging transmitters in fixed locations nationwide. The paging transmitters are also supported by a control system and at least one paging terminal. The paging terminal operates to supply the pages to be broadcast to each of the paging transmitters. The combination of paging transmitters, control systems, and paging terminals, is collectively known as the paging infrastructure of the paging system.

For modern two-way paging systems where the pagers can send as well as receive information, the paging infrastructure will also have a large number of paging receivers in fixed locations. The frequency band at which the pagers transmit to the paging system is referred to as the "reverse channel". Similarly, messages from the pagers to the paging system are referred to as "reverse channel messages".

In a two-way paging system, the paging infrastructure tracks the location of the pagers in order to deliver messages to the pagers using only a subset of the fixed location transmitters, thus allowing reuse of the frequency in geographically separate locations. One prior art method of tracking pagers requires the pagers to transmit a registration message when the pager enters a new geographic "area". An "area" is specified by the paging system and indicated to the pagers by periodically broadcasted system wide informational messages.

The registration message, and indeed all reverse channel messages, are transmitted by the pager on a predefined or otherwise dictated frequency. In order to prevent two paging units from transmitting on the reverse channel simultaneously, the paging system provides an indication to a paging unit of the time period at which to transmit the reverse channel message. Thus, the reverse channel messages are transmitted in a time division multiplexed manner.

More specifically, in most prior art two-way paging systems, the reverse channel is divided into discrete time intervals referred to as frames. The frames are further divided into individual time slots that accommodate the reverse channel messages broadcast by the paging units. Additionally, other portions of the frames are reserved for synchronization and other "overhead" requirements. An example of such a two-way paging protocol is the ReFLEX™ family of paging protocols that is widely used in the industry.

Because of the time division multiplexed protocol used in reverse channel messages, it is crucial for the paging units to be synchronized with a master clocking scheme, such as the Global Positioning System (GPS). For further information regarding a two-way paging system, the reader is directed to U.S. Pat. No. 5,663,715 entitled "Synchronized Paging System" to Godoroja assigned to the same assignee as the present invention and herein incorporated by reference.

Typically, in the prior art, reverse channel transmissions are scheduled to occur sequentially at the beginning of each frame, for as many time slots as are required in order for all paging units that need to transmit have the opportunity to do so. Further, in most commercially operated systems, not all of the time slots in a given frame are required to fully service the paging units.

For a multitude of reasons, it is not always possible for all of the paging units to be perfectly synchronized in time to each other and to the paging system. This results in some paging units transmitting outside of their assigned time slot and possibly spilling over into other adjacent time slots. Because the paging units are assigned time slots in a sequential manner in the prior art, this will result in what is termed "adjacent time slot interference". For example, if two paging units transmitting in adjacent time slots have timing errors such that a first transmission is late and the following transmission is early, the transmissions may interfere with each other.

Furthermore, the transmitters located in the paging units used to transmit the back channel messages, for reasons of economy, are generally spectrally imperfect. This results in reverse channel messages not only being transmitted in the desired frequency channel, but also in nearby frequency channels. These reverse channel messages in nearby frequency channels are referred to as "image" messages. This results in what is termed adjacent channel interference. Adjacent channel interference is undesirable in locations where multiple two-way paging systems are operating. For example, in large metropolitan areas, two or more separate two-way paging systems in operation are not uncommon. In addition, it is typical for the paging systems to be assigned reverse channel frequency bands that are close to or adjacent to each other. Thus, the image messages transmitted by a paging unit for a first paging system may interfere with the authentic reverse channel messages transmitted on a second paging system.

In addition, because radio frequency channels are scarce resources, the same radio frequency channel may be re-used in a cellular system. Even though these cellular systems are designed such that units using the same radio frequency channel are geographically separate, the units may still interfere with each other. This is termed co-channel interference.

Therefore, there is a need for implementing reverse channel transmissions so as to minimize interference. The present invention addresses these and other problems of the prior art.

SUMMARY OF THE INVENTION

In a two-way paging system including a paging terminal, a plurality of paging transmitters, a plurality of paging receivers, and a plurality of two-way paging units, said plurality of two-way paging units transmitting reverse channel messages to said paging receivers in a time division multiplexed protocol, said protocol including a frame with a plurality of reverse channel time slots, a method of assigning reverse channel time slots to said paging units is disclosed. The method comprises: (a) determining a set of transmitting paging units from said plurality of two-way paging units, said set of transmitting paging units being those of said plurality of two-way paging units that are to transmit a reverse channel message; and (b) randomly assigning each of the transmitting paging units in said set of transmitting paging units one of said reverse channel time slots in said frame.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
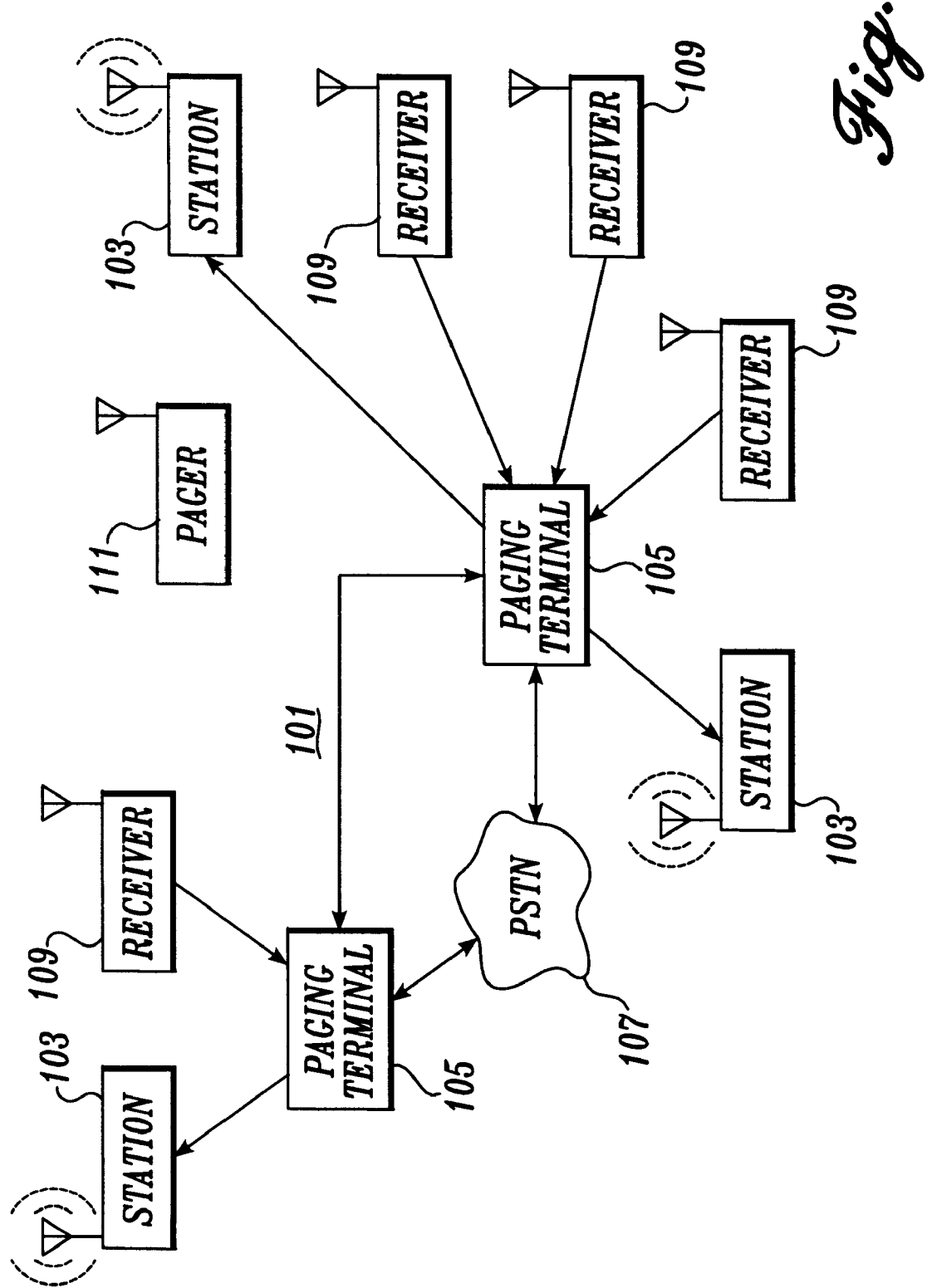
FIG. 1 is a schematic diagram of a typical paging system.

FIG. 1 shows a paging system 101 that includes paging stations 103, paging terminals 105, public switched telephone network (PSTN) 107, paging receivers 109 and pager 111. It can be appreciated by those skilled in the art that while only two paging terminals 105 are shown, a paging system may include many paging terminals. Likewise, the number of other components of the paging system 101 are merely illustrative. Indeed, paging systems can be grown or shrunk to meet consumer demand.

The paging stations 103 are also referred to as base stations or paging transmitters. In operation, callers who wish to page a subscriber use the PSTN 107 to call the subscriber's pager telephone number. Alternatively, pages can be originated through a computer network directly connected to a paging terminal. The call is routed, perhaps through a plurality of paging terminals, from the PSTN 107 to paging terminal 105 which formulates a page. The page is distributed over a communications network to each of the paging stations 103. The paging stations 103 in turn transmit the page throughout the geographic coverage area of the paging system 101.

The pager 111 receives the page and processes the message embedded within the page for display to the subscriber. In the case of a two-way paging system, the pager 111 broadcasts back to paging receivers 109 an acknowledgment signal that informs the paging terminal 105 that the page has been successfully received. Typically, the timing for broadcast of the acknowledgment signal is dictated by the paging system, for example, by embedding in the original received page the timing information. The pager 111 may also initiate other types of messages that are unsolicited and are not acknowledgments for received messages. In any event, the signals transmitted by a pager to a paging system will be referred to as reverse channel messages.

Figure 2:
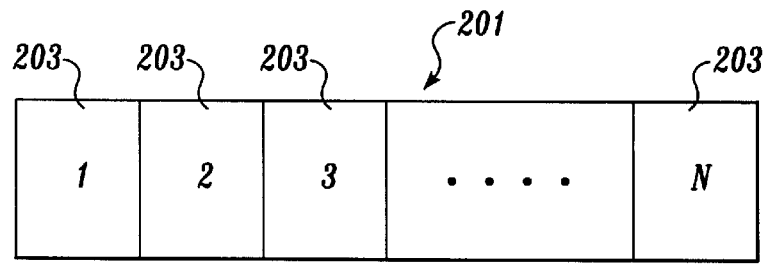
FIG. 2 is a schematic diagram of a frame used in structuring reverse channel transmissions.

Turning next to FIG. 2, a schematic illustration of a typical reverse channel frame 201 is shown. The frame 201 may be an arbitrary length of time, but in one actual embodiment, the frame is 1.875 seconds long. The frame 201 is divided into a plurality of time slots 203. The time slots 203 are discrete segments of time that are intended for use by paging units to transmit their respective reverse channel messages. In the example of FIG. 2, the frame 201 has N time slots numbered from 1 to N. It can be appreciated that the frame 201 typically also includes other reserved time slots used for other purposes not germane to the present invention and that are not shown for clarity.

As noted above, the assigned time slot for the reverse channel message is determined by the paging system. In particular, the paging system transmits a message to the paging unit informing the paging unit of the assigned time slot 203 upon which to transmit. In the case of an acknowledge back request, this message is typically included with the originating message.

In the case of the paging unit wishing to originate a message, the paging unit will transmit a request to the paging system for a time slot assignment. The paging unit will transmit the request on a predetermined "hailing" time slot that is reserved for unscheduled reverse channel messages. The hailing time slot is not shown in FIG. 2 and it can be appreciated that there may be more than one hailing time slot. The number of hailing time slots in a frame is generally determined by the number of paging units in the system. The greater the number of paging units, the greater the number of necessary hailing time slots in order to avoid collisions. The pager is informed by the forward channel, in every frame, the location of the boundary between scheduled and unscheduled reverse channel messages. The pager randomly decides when to transmit in the unscheduled area.

As noted above, in the prior art, the paging system assigned time slots sequentially from the beginning of the frame. However, in the present invention, the paging system randomly assigns time slots 203 for use uniformly throughout the frame 201. This can be seen in FIGS. 3 and 4 which shows a prior art assignment of time slots and assignment of time slots in accordance with the present invention, respectively.

In FIG. 3A, the frame 201 includes nine time slots 203. Assume for example that four paging units are to transmit reverse channel messages. In the prior art, the four paging units would be assigned the first four time slots in the frame 201. Thus, paging unit one PU1 would transmit in the first time slot, paging unit two PU2 would transmit in the second time slot, paging unit three PU3 would transmit in the third time slot, and paging unit four PU4 would transmit in the fourth time slot. While simple to schedule, this method increases the chance that adjacent time-slot interference would take place. In addition, because all of the reverse channel transmissions are packed together sequentially at the beginning of a frame, an increased probability of adjacent channel and co-channel interference arises. This is because, most commercial two-way paging systems operate with the same protocol (ReFLEX™) which typically sets the frame length and the absolute GPS time at which the first frame starts.

Figure 3:
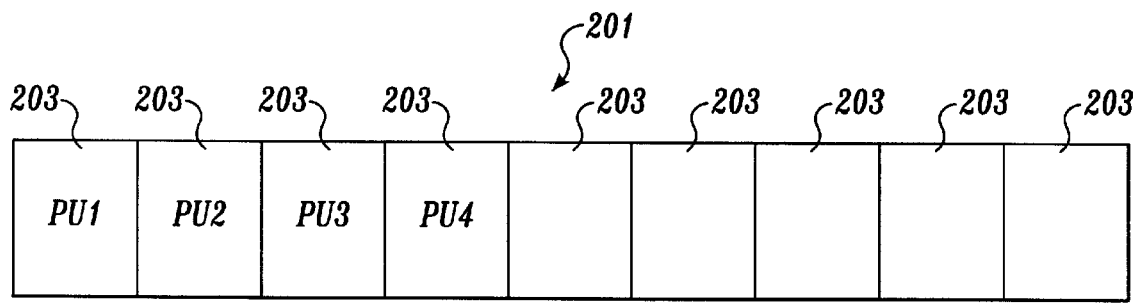
FIG. 3 is a schematic diagram illustrating a prior art technique of scheduling reverse channel transmissions.
Figure 4:
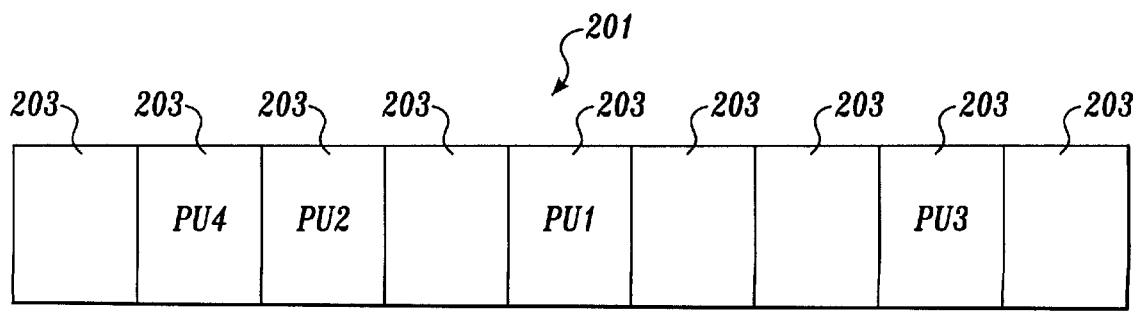
FIG. 4 is a schematic diagram illustrating a technique of scheduling reverse channel transmissions in accordance with the present invention.

Turning now to FIG. 4, like FIG. 3, the frame 201 also includes nine time slots 203. Assume again that four paging units are to transmit reverse channel messages. In accordance with the present invention, the four paging units are randomly assigned time slots 203 within the frame 201. Thus, instead of being assigned sequentially from the beginning of a frame 201 as in the prior art, the paging unit transmissions are spaced randomly throughout the frame 201. In the particular example shown in FIG. 4, paging unit one PU1 has been assigned to transmit in the fifth time slot, paging unit two PU2 has been assigned to transmit in the third time slot, paging unit three PU3 has been assigned to transmit in the ninth time slot, and paging unit four has been assigned to transmit in the second time slot.

Figure 5:
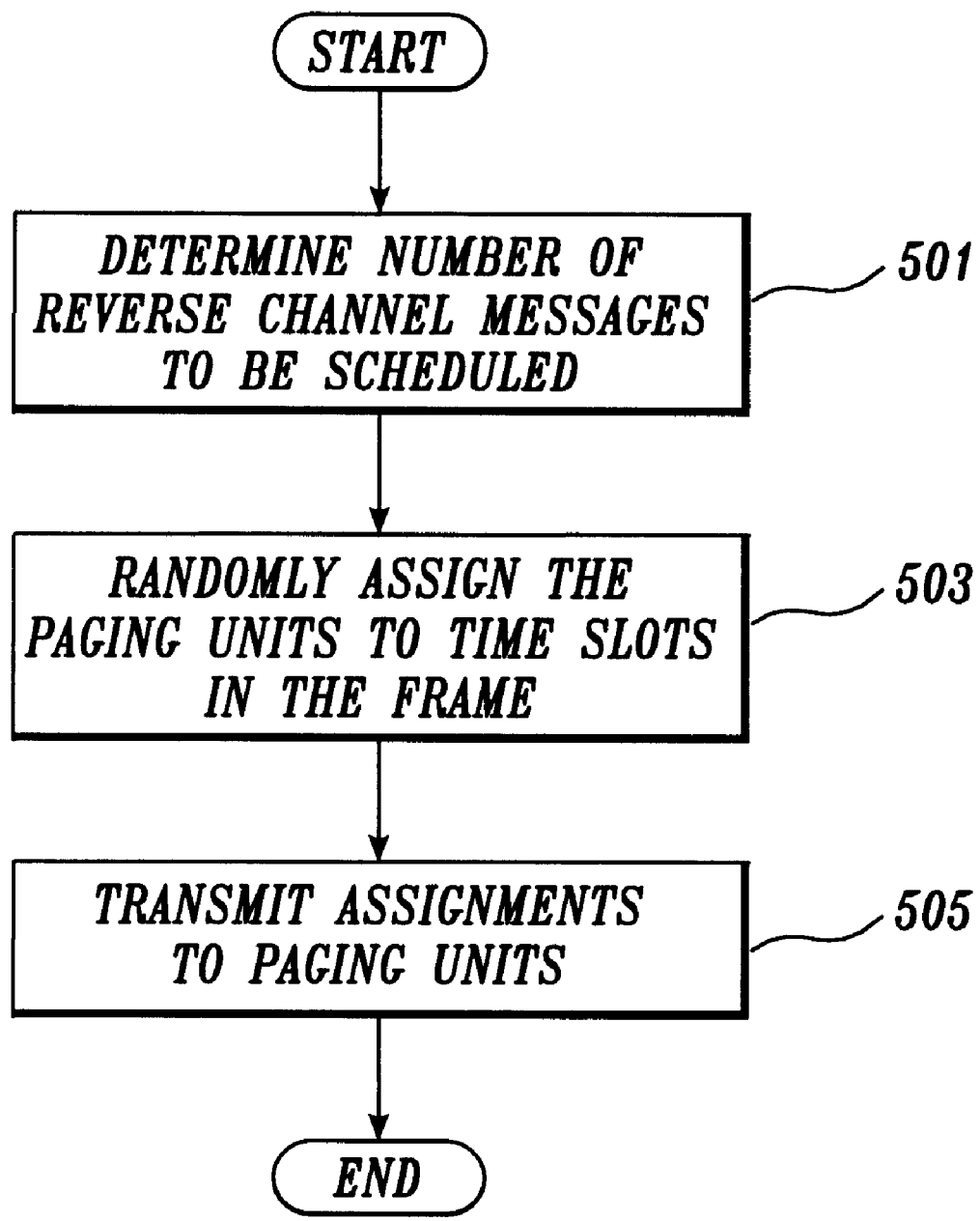
FIG. 5 is a flow diagram illustrating the method of scheduling reverse channel transmissions in accordance with the present invention.

Turning next to FIG. 5, a flow diagram illustrating the method of scheduling the reverse channel messages is shown. These steps are typically performed by the paging infrastructure, and more likely, the paging terminal of the paging system. First, at a box 501, a determination is made as to how many reverse channel messages (or paging units)

are to be scheduled. Next, at box 503, the paging units are then randomly assigned to time slots in the frame. Note, of course, that only one paging unit can be assigned to one time slot. Finally, at box 505, the assignment of time slots is transmitted as paging messages to each of the paging units.

The random assignment of time slots to the paging units can be accomplished in any number of ways that are apparent to one of ordinary skill in the art, such as by a random number generator. This random placement of the reverse channel messages in the frame helps to lessen interference. For example, in the scheme of FIG. 4, only paging unit four PU4 and paging unit two PU2 are capable of having adjacent time slot interference, since these are the only two time slots 203 that are being used and adjacent to each other. Furthermore, by randomizing the reverse channel messages, co-channel and adjacent channel interference is reduced. Moreover, with the teachings of the present invention, it can be appreciated by those skilled in the art that the assignment of the time slots may be further randomized to include assignment into multiple frames.

While such a technique of the present invention would not provide maximum advantage for systems that are fully loaded, i.e., all of the reverse channel time slots being used at all times, the present invention has been found to reduce adjacent channel, co-channel, and adjacent slot interference in non-fully loaded systems. Note that the more heavily loaded the reverse channel, the less the advantageous effect of the present invention.

Moreover, even in a fully loaded system, there are situations when it is advantageous to randomly schedule reverse channel messages. For example, suppose there is a pager at the periphery of the system which is being received very weakly at the system base receiver. If at each instance the pager is trying to transmit, a "strong" pager also transmits, the weak pager may not be able to get through to the base receiver. Randomly assigning the slots may still help the weaker pager to get through since without random assignment, the weak pager may be guaranteed through deterministic scheduling, to be transmitting at the same time or adjacent in time to a strong pager transmission.

While the preferred embodiment has been illustrated and described, it will be apparent that various changes can be made therein without departing from the spirit and scope of the invention.

The embodiments of the invention in which an exclusive property or privilege is claimed are defined as follows:

1. In a two-way paging system including a paging terminal, a plurality of paging transmitters, a plurality of paging receivers, and a plurality of two-way paging units, said plurality of two-way paging units transmitting reverse channel messages to said paging receivers in a time division multiplexed protocol, said protocol including a frame with a plurality of reverse channel time slots, a method of scheduling said reverse channel messages by assigning reverse channel time slots to said two-way paging units comprising:

(a) determining a set of transmitting paging units from said plurality of two-way paging units, said set of transmitting paging units being those of said plurality of two-way paging units that are to transmit a reverse channel message; and (b) scheduling said reverse channel messages by randomly assigning each of the transmitting paging units in said set of transmitting paging units one or more of said reverse channel time slots in said frame, such that after at least some of the time slots within the frame have been scheduled, but before the transmission of the frame begins, said scheduled time slots will have been randomly interspersed with unscheduled time slots within the frame.

2. The method of claim 1 further including the step of using said paging transmitters to inform each of the transmitting paging units in said set of transmitting paging units their assigned one of said reverse channel time slots in said frame.

3. A two-way paging system comprising:

(a) a plurality of two-way pagers, said plurality of two-way pagers operative to formulate a reverse channel message for transmission on a reverse channel frequency in a time division multiplexed protocol, said protocol including a frame with a plurality of reverse channel time slots;

(b) a paging terminal for formulating paging messages for transmission to said plurality of two-way pagers;

(c) a plurality of paging transmitters for transmitting said paging messages to said plurality of two-way pagers; and (d) a plurality of paging receivers for receiving said reverse channel message transmitted by said pager, wherein said paging terminal schedules said reverse channel messages by assigning reverse channel time slots to said two-way paging units by: (i) determining a set of transmitting paging units from said plurality of two-way paging units, said set of transmitting paging units being those of said plurality of two-way paging units that are to transmit a reverse channel message; and (ii) scheduling said reverse channel messages by randomly assigning each of the transmitting paging units in said set of transmitting paging units one or more of said reverse channel time slots in said frame, such that after at least some of the time slots within the frame have been scheduled, but before the transmission of the frame begins, said scheduled time slots will have been randomly interspersed with unscheduled time slots within the frame.

4. The two-way paging system of claim 3 further wherein said paging transmitters transmit a message to each of the transmitting paging units in said set of transmitting paging units indicating the assigned one or more of said reverse channel time slots in said frame.

5. In a wireless communication system including a central controller, one or more receivers, and a plurality of paging units, said paging units utilizing one or more reverse channels to transmit reverse channel messages to said receivers in a time division multiplexed protocol, said protocol including a frame with a plurality of reverse channel time slots, a method of scheduling said reverse channel messages by assigning reverse channel time slots to said paging units, comprising:

(a) determining a subset of paging units from said plurality of paging units, said subset of paging units including paging units that have requested one or more reverse channel time slots for transmitting reverse channel messages; and (b) scheduling said reverse channel messages by assigning each of the paging units in said subset of paging units one or more of said reverse channel time slots in said frame on a randomized basis, such that after at least some of the time slots within the frame have been scheduled, but before the transmission of the frame begins, said scheduled time slots will have been randomly interspersed with unscheduled time slots within the frame.

6. The method of claim 5, wherein said wireless communication system further includes transmitters, said transmitters being used to inform each paging unit in said subset of paging units of their assigned one or more reverse channel time slots.

7. The method of claim 5, wherein the paging units are two-way subscriber pagers.

8. A wireless communication system comprising:
   (a) a plurality of paging units, said plurality of paging units transmitting reverse channel messages in reverse channel time slots; and
   (b) one or more receivers for receiving said reverse channel messages transmitted by said paging units,
   wherein said reverse channel messages are scheduled by:
   (i) determining a set of paging units that have reverse channel messages to transmit; and (ii) assigning each of said paging units in said set of paging units one or more of said reverse channel time slots on a randomized basis, such that after at least some of the time slots within the frame have been scheduled, but before the transmission of the frame begins, said scheduled time slots will have been randomly interspersed with unscheduled time slots within the frame.

9. The wireless communication system of claim 8, wherein said wireless communication system further comprises transmitters that are used to inform each paging unit in said set of paging units of their assigned one or more reverse channel time slots.

10. The wireless communication system of claim 8, wherein the paging units are two-way subscriber pagers.

* * * * *